March 5, 1968   G. C. GRAHAM ETAL   3,371,770
APPARATUS FOR MOVING PIPE THROUGH A COATING MACHINE
Filed Oct. 25, 1966   2 Sheets-Sheet 1
Fig. 1
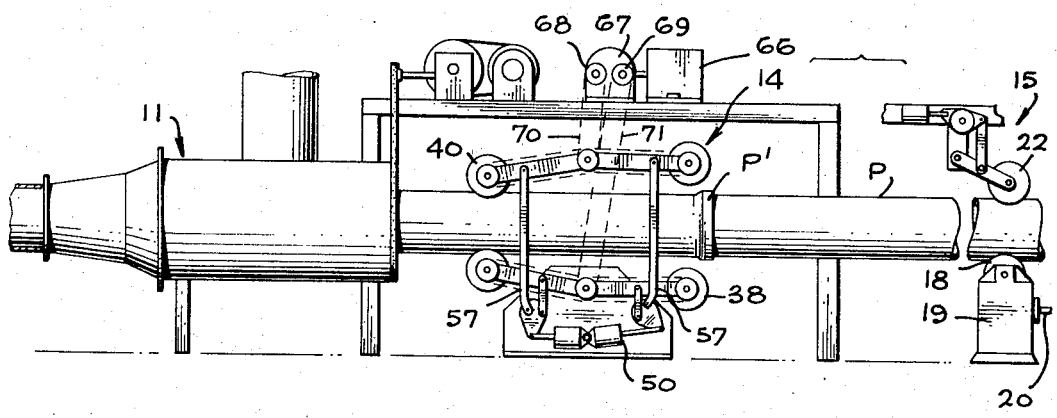
Fig. 3
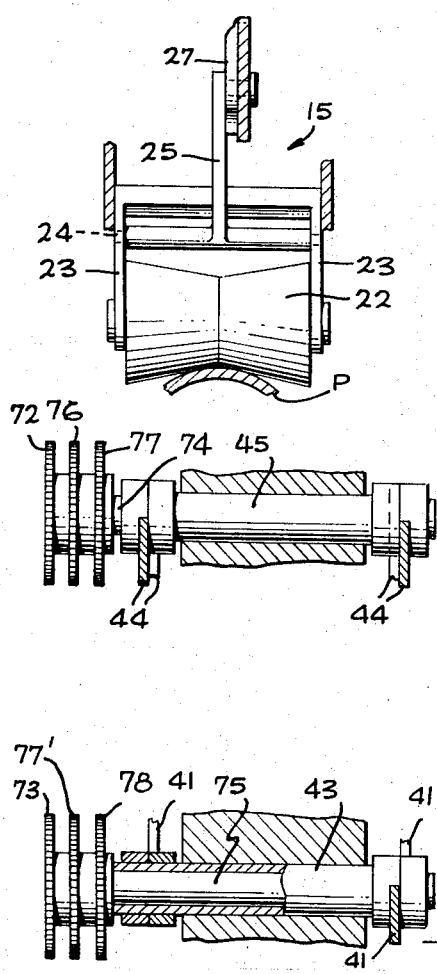
Fig. 4
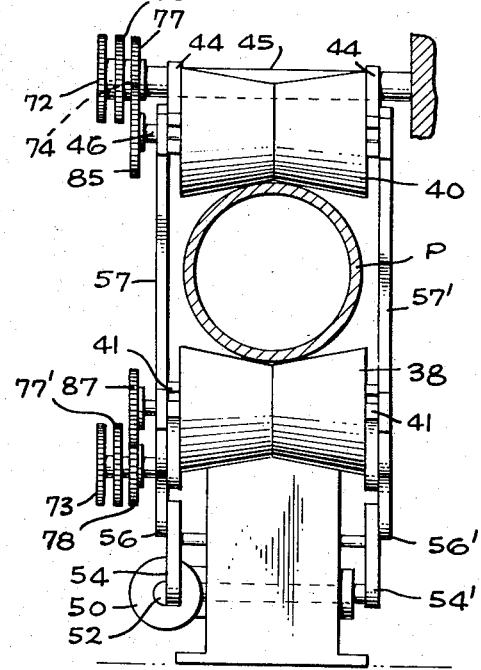
Fig. 5
INVENTORS
GORDON C. GRAHAM
CONSTANTINOS E. ZERVOS
BY
ATTORNEYS

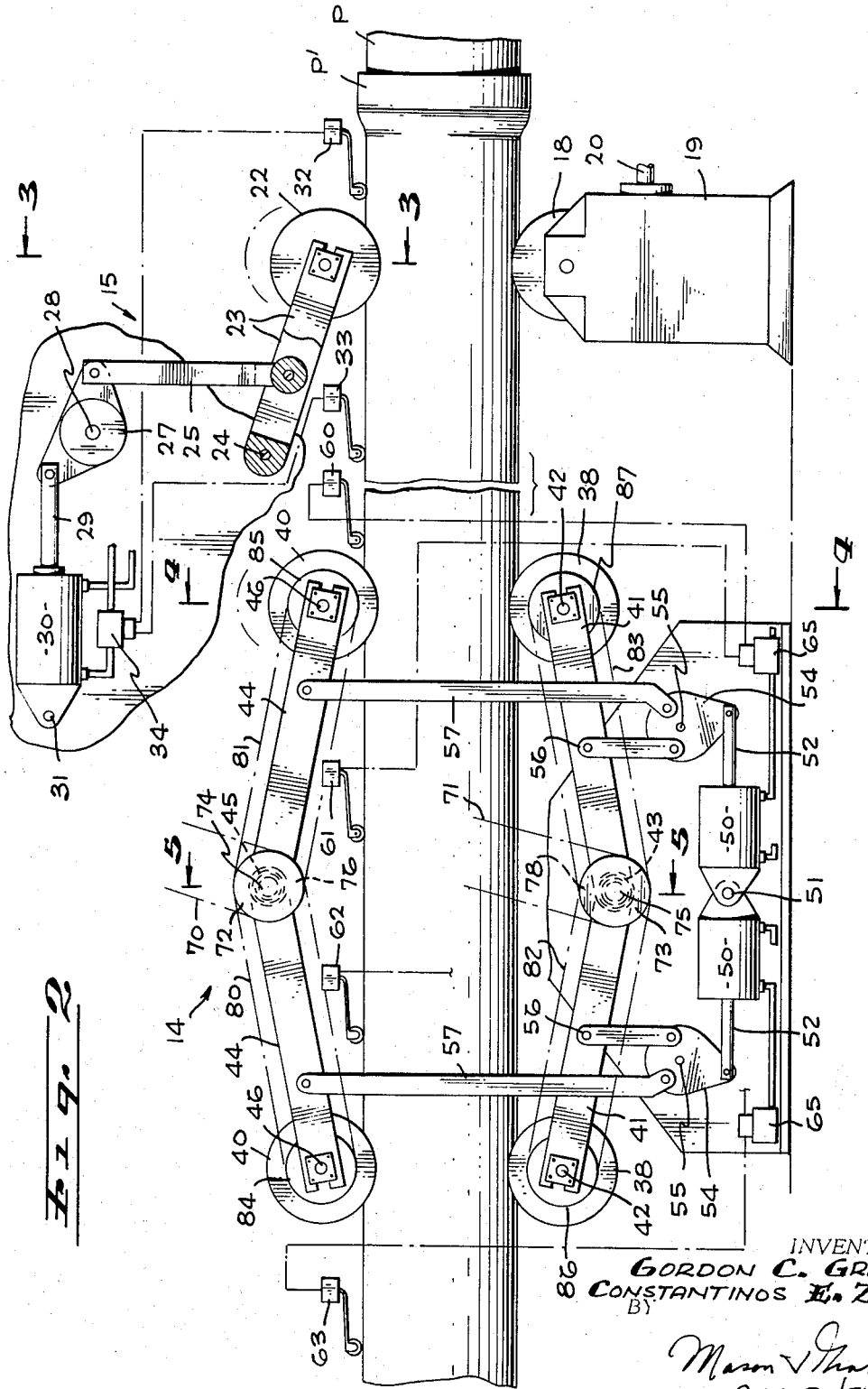

United States Patent Office 3,371,770
Patented Mar. 5, 1968

3,371,770
APPARATUS FOR MOVING PIPE THROUGH
A COATING MACHINE
Gordon C. Graham, Glendora, and Constantinos E.
Zervos, Los Angeles, Calif., assignors to American
Pipe and Construction Co., Monterey Park, Calif.,
a corporation of California
Filed Oct. 25, 1966, Ser. No. 589,453
10 Claims. (Cl. 198—167)

ABSTRACT OF THE DISCLOSURE

The application discloses sets of retractable power-driven rollers for supporting and advancing a pipe through coating apparatus and means for selectively retracting the rollers of the sets of rollers to pass enlarged sections of the pipe while holding the pipe and continuing to advance it with the remaining sets of rollers.

---

This invention has to do with apparatus for supporting and moving pipe through a pipe coating machine where an exterior coating of cement mortar or other substance is applied to the pipe by extrusion.

Apparatus of the type presently in use includes a plurality of carrier rollers, at a fixed height, one or more of which may be driven, which support and advance the pipe through the coating apparatus together with holddown rollers above the pipe. Since the pipe has enlarged portions spaced along its length, such as bell ends or bands, the passage of such enlarged portions over the carrier rollers raises the pipe and throws it off the prescribed centerline of the coating apparatus, resulting in an inferior coating. In this connection in certain types of operations where a coating of cement mortar or the like is extruded onto a pipe, it is essential to transport the pipe being coated through the coating apparatus on a prescribed centerline which is determined by the center of the coating device, since any deviation of the pipe from this position or alignment causes an uneven thickness of the coating being applied, rendering it unacceptable.

An object of the present invention is to provide a new and improved means of supporting and moving or transporting lengths of pipe axially to and through a pipe coating apparatus and at the same time maintaining the pipe on the prescribed centerline of the coating apparatus.

More particularly it is an object to provide apparatus for supporting and moving pipe through a pipe coating machine which embodies sets of rollers spaced along the path of movement of the pipe in which each set of rollers includes a lower carrier roller and an upper hold-down roller and to provide means for retracting the rollers of each set to allow the passage of enlarged portions of the pipe without causing the pipe to be elevated and thus inclined with respect to the prescribed path of movement.

These and other objects will be apparent from the drawings and the following description. Referring to the drawings, which are to a large extent diagrammatic:

FIG. 1 is a side elevational view, somewhat diagrammatic, of apparatus for coating a pipe and of apparatus embodying the invention for moving the pipe through the coating apparatus;

FIG. 2 is a side elevational view, partly in section, of the pipe supporting and moving apparatus, but on a larger scale;

FIG. 3 is a fragmentary sectional view on line 3—3 of FIG. 2;

FIG. 4 is a sectional view on line 4—4 of FIG. 2; and

FIG. 5 is a fragmentary sectional view on line 5—5 of FIG. 2.

More particularly describing the invention, the letter P designates a pipe to be coated and numeral 11 generally designates apparatus for extruding a coating of cement mortar or the like on the pipe as the latter is moved from right to left through the apparatus. Such apparatus is known in the art and one example is shown in Patent No. 3,231,957. Numeral 14 generally designates the apparatus of the invention for supporting and transporting the pipe and maintaining it in proper alignment with the coating apparatus 11, and numeral 15 designates auxiliary apparatus for transporting and moving the pipe.

In order to simplify the showing and description, much of the framework and unnecessary apparatus has not been shown and the views are to a large extent diagrammatic.

At some distance from the coating apparatus 11 is a motor-driven initial carrier roller 18 which is supported on a pedestal 19 and is driven through suitable reduction gearing (not shown) within the pedestal from a conveniently located motor connected by drive shaft 20. Since this particular carrier roller is normally located at a considerable distance from the coating apparatus 11, the fact that the carrier roller is on a fixed axis and cannot be lowered is not important to maintaining the pipe in alignment, since the pipe will give sufficiently to allow or compensate for any elevation thereof by an enlarged portion P′ of the pipe passing over the carrier roller. Above carrier roller 18 we provide an idler hold-down roller 22 which is normally in engagement with the pipe. The rollers thus far described, and those to be described, may be made of any suitable material, such as steel coated with an outer layer of rubber or plastic. The rolls are preferably spool-shaped, as shown, that is, so shaped that each half is a truncated cone, thereby centering the carried pipe.

The upper roller 22 is mounted on a yoke 23 which is pivotally supported at 24. The yoke is connected by a rod 25 to a bell crank 27 that is pivotally supported at 28 and is connected to be operated by the piston rod 29 of a fluid jack 30 that is pivotally mounted at 31. With this arrangement the roller 22 may be raised or retracted from the pipe to permit passage of an enlargement P′ on the pipe. To facilitate this, sensing devices 32 and 33 are mounted respectively before and behind the roller 22 for engagement with the pipe and these may be of any suitable type. For example, each sensing device may be a switch or the like connected to control a solenoid valve 34 which in turn controls flow of pressure fluid to the cylinder of unit 30. Details of the fluid and electrical circuits are not shown because any of several well-known types may be used.

The main apparatus 14 for supporting and advancing the pipe is shown as comprising two sets of upper and lower rollers, although if desired, additional sets may be used. Each set comprises a lower carrier roller 38 and an upper hold-down roller 40. In the form shown each lower roller is mounted upon a pair of hingedly mounted levers 41 which journal a shaft 42 to which the roller is fixed. The levers 41 are pivotally mounted on a fixed tube 43. In like manner each upper roller 40 is carried by a pair of levers 44 which are pivotally mounted on a fixed tube 45 and rotatively carry a shaft 46 to which the roller is fixed.

The upper and lower rollers of each set are adapted to be simultaneously retracted for the passage of enlarged portions of the pipe. To accomplish this, each set of upper and lower rollers is provided with a fluid jack 50 is pivotally mounted at its base at 51. The jack is connected by its piston rod 52 to a disk 54 that is fixed to a shaft 55. The disk is connected to the levers 41 and 44 on the near side of the apparatus by levers 56 and 57, respectively. A similar disk 54′ and levers 56′ and 57′ are provided on the far side of the apparatus. It will be apparent that when the jack is actuated, partial rotation of the disks 54, 54' counterclockwise will serve to lower the lower roller 38 and raise the upper roller 40.

The retraction of the sets of rollers is accomplished automatically and for this purpose, sensing devices 60 and 61 are provided ahead of and behind, respectively, the first set of rollers and sensing devices 62 and 63 are provided ahead of and behind, respectively, the second set of rollers, to sense and signal the approach and subsequent passage of an enlargement of the pipe. As previously suggested, any of various known control means may be used to operate the fluid jacks, and by way of example, each sensing device may be a switch or microswitch controlling a circuit to a solenoid valve 65 that in turn controls pressure fluid to the jack in any well-known manner.

Preferably both the upper and lower rollers of the main apparatus 14 are driven. In the form shown a motor 66 drives a gear reduction unit 67 having oppositely turning sprockets 68 and 69. Drive chains 70 and 71 are trained around sprockets 72 and 73, respectively, fixed to shafts 74 and 75, respectively. Shaft 74 is journaled in the tube 45 and shaft 75 is journaled in the tube 43. Each of shafts 74 and 75 have two additional sprockets fixed thereto, these being designated 76 and 77 on shaft 74, and 77 and 78 on shaft 75. These serve to drive chains 80, 81, 82, and 83 that are trained around sprockets 84, 85, 86, and 87, respectively. Sprockets 86 and 87 are fixed to the roller shafts 42, while sprockets 84 and 85 are fixed to the roller shafts 46.

In operation of the apparatus, rollers 38 and 40 and roller 18 are driven to move the pipe along to and through the coating apparatus 11. Any enlargements P' are sensed by the sensing devices 32 and 33 which actuate the means for raising the first holddown roller 22. Since the first roller 18 is located at a considerable distance from the coating machine and since the steel shell pipe being coated is relatively thin and flexible, the raising or inclining of the pipe as an enlargement P' passes over roller 18 will not throw the pipe out of alignment with the coating apparatus, since it is held by the means 14. As the pipe progresses and the enlarged portions thereof reach the sets of rollers of the means 14 the upper and lower rollers of each set retract to permit passage of the enlargement and then return to grip the pipe so that the pipe can be maintained in axial alignment with the coating apparatus.

Although we have illustrated and described a preferred form of our invention, we contemplate that various changes and modifications can be made therein without departing from the invention, the scope of which is indicated by the following claims. For example, in place of fluid jacks for motive power, we might employ solenoids to retract the various rollers.

We claim:

1. Apparatus for transporting pipe through a coating machine, comprising sets of motor-driven pipe-engaging and -supporting drive rollers, each set including an upper and a lower roller, said sets being spaced along the path of travel of the pipe to be coated, means for retracting both rollers of a set of rollers from a pipe being fed therethrough, means for sensing enlargements of the pipe being fed operably connected to actuate the means for retracting the rollers of the sets whereby to cause each set of upper and lower rollers individually to retract for the passage therebetween of any enlargements of the pipe being fed and to return thereafter to pipe-engaging position.

2. The apparatus set forth in claim 1 in which a motorized carrier roller is provided ahead of said sets of rollers and a retractable holddown roller is provided above said carrier roller, and in which means is provided for retracting said holddown roller when an enlarged portion of the pipe approaches.

3. The apparatus set forth in claim 1 in which the means for sensing enlargements of the pipe includes sensing devices along the path of travel of the pipe immediately ahead of and behind said sets of rollers.

4. Apparatus for transporting pipe through a coating machine, comprising at least two parallel motor-driven carrier rollers for supporting a pipe to be coated, said rollers being spaced laterally of their axes of rotation along the path of travel of the pipe to be coated, a holddown roller above each carrier, a movable support for each of said carrier rollers and for each of said holddown rollers, said supports being movable in a manner such that the rollers can be retracted from engagement with the pipe, powered means for operating said supports, a sensing device ahead of and another behind each pair of carrier and holddown rollers, and means operably connecting said sensing devices with the powered means for operating the supports.

5. The apparatus set forth in claim 4 in which the movholddown rollers are power driven.

6. The apparatus set forth in claim 4 in which the movable support for each roller comprises a pair of laterally spaced levers pivoted at one end on a common axis and journaling a shaft at the other end upon which the roller is carried.

7. The apparatus set forth in claim 4 in which the powered means for operating the supports comprises fluid jacks.

8. The apparatus set forth in claim 4 in which the movable support for each roller comprises a pair of laterally spaced levers pivoted at one end on a common axis and journaling a shaft at the other end upon which the roller is carried and in which the powered means for operating the supports comprises fluid jacks.

9. A retractable powered roller means comprising an upper roller and a lower roller between which a pipe or other elongated object is fed, a pivoted support for each roller including a pair of laterally spaced support levers pivoted at one end on a common mounting axis and journaling a shaft at their other ends upon which the roller is mounted, a fluid jack, and lever means connecting the jack to said support levers for pivoting the same simultaneously in opposite directions about their mounting axis.

10. The apparatus set forth in claim 9 in which sensing devices for sensing enlargements of the pipe are provided and operably connected to control the fluid jack.

References Cited

UNITED STATES PATENTS

| | | | |
|---|---|---|---|
| 2,613,706 | 10/1952 | Smith | 226—186 X |
| 2,655,066 | 10/1953 | Siegerist | 226—154 X |
| 3,090,534 | 5/1963 | Frommer et al. | 226—180 X |
| 3,225,415 | 12/1965 | Stoveken et al. | 226—186 X |
| 3,231,957 | 2/1966 | Ranker | 25—38 |
| 3,263,284 | 8/1966 | Orr et al. | 226—176 X |
| 3,314,115 | 4/1967 | Saunders et al. | 226—176 X |

EVON C. BLUNK, *Primary Examiner.*

M. L. AJEMAN, *Assistant Examiner.*